Dec. 6, 1927.

G. FRIEDRICH ET AL 1,651,812

KNOTTING AND WEAVING LOOM

Filed Jan. 6, 1926    5 Sheets-Sheet 1

Inventors:
Gustav Friedrich
and Ernst Reich
By Luis Pamelee
Attorney

Dec. 6, 1927.  
G. FRIEDRICH ET AL  
1,651,812  
KNOTTING AND WEAVING LOOM  
Filed Jan. 6, 1926     5 Sheets-Sheet 2

Inventors  
Gustav Friedrich  
and Ernst Reich  
By  
Attorney.

Dec. 6, 1927. 1,651,812

G. FRIEDRICH ET AL

KNOTTING AND WEAVING LOOM

Filed Jan. 6, 1926 5 Sheets-Sheet 3

Inventors:
Gustav Friedrich
and Ernst Reich
By
Attorney

Dec. 6, 1927. 1,651,812

G. FRIEDRICH ET AL

KNOTTING AND WEAVING LOOM

Filed Jan. 6, 1926 5 Sheets-Sheet 4

Inventors
Gustav Friedrich
and Ernst Reich
By
Attorney.

Patented Dec. 6, 1927.

1,651,812

UNITED STATES PATENT OFFICE.

GUSTAV FRIEDRICH, OF PINKAFELD, AUSTRIA, AND ERNST REICH, OF BUDAPEST, HUNGARY.

KNOTTING AND WEAVING LOOM.

Application filed January 6, 1926, Serial No. 79,608, and in Austria January 9, 1925.

This invention relates to a knotting and weaving loom for making knotted fabrics such as "Smyrna" and "Persian" carpets by machinery.

In this machine, a number of simultaneously acting knotting devices are arranged, facing the warp threads, so that each of said devices commands a certain section of warp ends and is adapted to be moved across the warps in a manner corresponding to the setting of the knots.

The machine consists accordingly of a loom, which is provided with a dobby machine and a jacquard machine, the former of which lifts the warp ends on which the knots are to be formed, and prepares the shed for the shuttle, whilst the jacquard effects the selecting of the variously coloured pile threads.

The first point in connection with the invention is that the knotting devices, individually or in groups, consist of a frame, suspended so as to swing on a rotary shaft extending across the loom, said frame carrying the knotting mechanism and the entire mechanism transforming the rotary motion of the main shaft into the thread-selecting, spacing and knotting movements. As the result of this arrangement, the connection between the revolving main shaft and the knotting devices is of so simple a character that any desired number of knotting devices—corresponding to the desired width of fabric—can be attached to the loom. Moreover, the knotting devices can be attached to a loom of the ordinary type.

The knotting device is also of such a character that both the Smyrna and Persian type of knots can be made and drawn tight, with the most economical consumption of pile threads, as with a hand loom.

The knotting mechanism is also characterized by a special form of colour selector which, whilst occupying very little room, is able to deal with a maximum number of colours and select them in an infallible manner.

The loom is provided, for making the selvedges, with figuring devices which can be set up at any part of the width of the loom, in order to produce carpets of different widths. The selvedges are made in exactly the same way as in the case of hand-knotted carpets.

In the accompanying drawings:

Figs. 18 and 19 show another modification of the loop twister in front and side elevation respectively, and Fig. 20 a modification of this loop former.

Figs. 21–26 represent further modifications of the loop twister.

Figure 1:
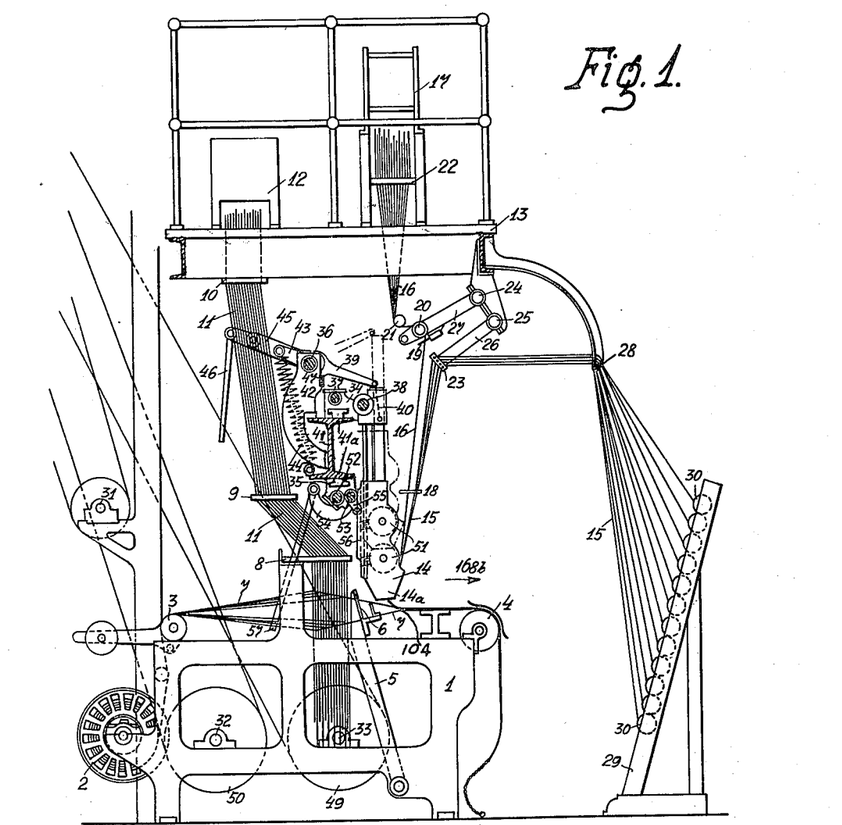
Fig. 1 illustrates a diagrammatic side elevation of the machine.
Figure 2:
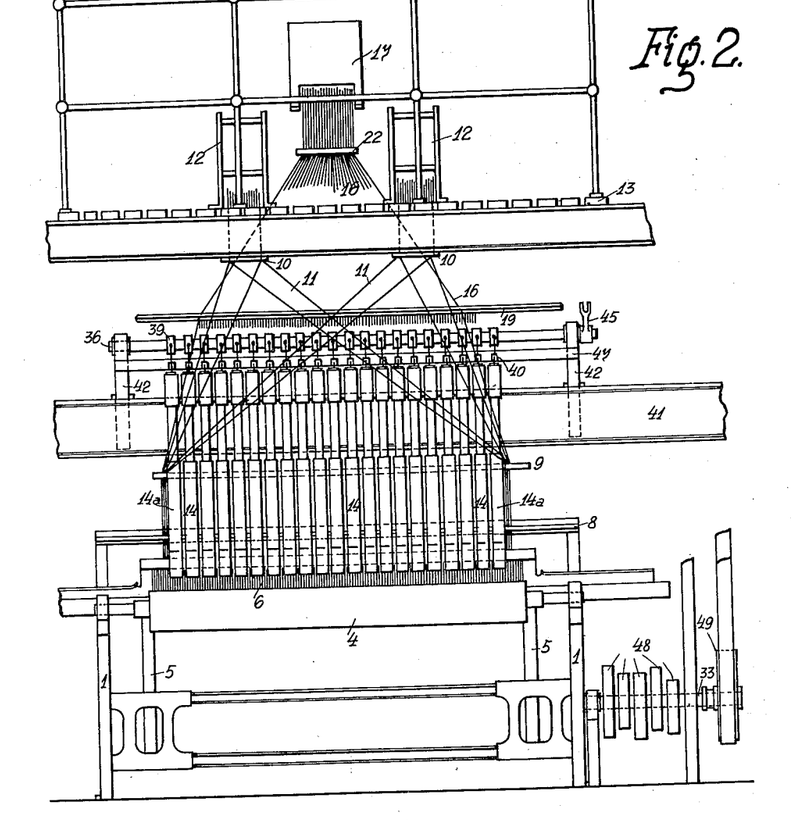
Fig. 2 a front elevation of same from the weaver's stand, certain parts having been omitted in order to make the drawing clearer.

According to Figs. 1 and 2, the loom consists of a frame 1 with the warp beam 2, the tension beam 3 and the cloth beam 4. 6 is the slay, adapted to swing on the swords 5, and 7 represents the warp ends. The heald cords 11, passing through the draughting plates 8, 9 and 10, are operated by the dobby machine 12, which is mounted on the frame 13. This latter also carries the jacquard machine 17—22, which serves to operate the colour selector in the manner hereinafter described. 41 is a rail extending right across the full width of the loom and supporting the knotting devices 14. Each of these knotting devices commands only a certain width of warps, over which the corresponding knotting device is moved transversely in relation to the fabric. The number of knotting devices depends on the width of the sections commanded by each, and on the total width of the carpet to be produced.

The slides 34 are mounted in guides 41ª on the rail 41 and, by means of two lead spindles 37, 52, are adapted to be moved across the loom for the width of a section commanded by a knotting device in each case.

The upper slide 34 carries the rotary shaft 38 driving the knotting devices 14, said shaft being operated from the main shaft of the loom by gearing that is not shown in the drawing.

As can be seen from Figs. 35 and 36, the individual knotting devices are suspended on the rail 41 in the following manner:

Each knotting device is housed in a separate casing 180, containing a hollow shaft 178, which is adapted to slide through a bore in a box 226, loosely mounted on the shaft, and, by means of a rod 40, pivoted inside the shaft 178 at 179, is suspended on a lever 39 (Fig. 1). The levers 39 are keyed on to a shaft 36 rotatably mounted on brackets 42 on the rail 41 and is rocked, by means of a rod 46, engaging on the arm 45 of the shaft 36 and operated by the control mechanism 31 through cams, in order to enable the knotting devices 14 to be raised and lowered in the guides of the boxes 226. The spring 44, or a number of same, engaging the arm 43 of the shaft 36, serves to partly counterbalance the weight of the knotting devices. In addition to the rising and falling motion, the knotting devices have also to rock about the shaft 38. For this purpose, a rotatable shaft 53 is mounted in the lower slide 35 and is controlled from the main shaft 33 through lifting cams and by means of the arm 54 and rod 57. Facing each knotting device, the shaft 53 carries lever arms 55 engaging in a vertical guide 56 in the casing 180 by means of an anti-friction roller 176 (Fig. 35). The knotting devices are driven through shafts 173 mounted in boxes 226 and rotated from the shaft 38 by means of bevel pinions or other gearing. A hollow shaft 174 rotatably mounted in bearings 177 inside the casing 180 of the knotting device is adapted to be slipped over the shaft 173 and is coupled thereto by a groove and feather connection, so that the shaft 174 is turned by the shaft 173, whilst the former can be moved in the vertical direction. After releasing the connection between the suspensory rod 40 and the corresponding lever 39, the knotting device can be removed, and replaced with equal ease, so that the knotting loom can be readily adapted for different widths of fabric.

14ª (Fig. 2) are the figuring devices for making the selvedges, and are mounted in similar casings to those of the knotting devices, and are suspended on the shaft 38 and driven thereby in the same way.

31 is the main control shaft, which throws the couplings for the shaft 32 or 33 out of and into action alternately, in such a way that the shaft 33 controls the operations during the knotting process, whilst, on the other hand, when the knotting of a row of loops is completed, the shaft 32 controls the operation of the loom.

The pile threads 15 are fed to each knotting device from bobbins 30, mounted on a rack 29, over guide rails 28 and the grid 23, and pass in each case into a colour selector 78 (Fig. 35), which is arranged in the casing 180 and will be fully described hereinafter. The cords 16 (Fig. 1) serving to operate the colour selectors are passed through the forks 19 and over the guide rails 20, 21 to the jacquard 17, 22. In order to maintain the pile threads and the cords 16 under uniform tension during the rocking and vertical movements of the knotting devices 14, the grid 23 and guide rail 20 are mounted on levers 26 and 27, adapted to turn on pivots 25 and 26 and operated by lifting cams 48 (Fig. 2) by means of a device not shown in the drawing.

Each knotting device comprises the following arrangements:

1. A colour selector to which the several, variously coloured pile threads are fed, and which, under the action of the jacquard, brings into the feed position the end of the pile thread called for by the design.

2. A tongs which grips the thread end that has been brought into the feed position, draws out the length needed for forming the loop and feeds it to the loop twister.

3. A loop twister which grips the two ends of the pile thread serving to form the loop, and, in conjunction with a pusher blade, forms the knot.

4. A knife which cuts off the length of thread drawn out by the tongs.

5. A warp end guider which brings the warp ends that have been raised for the purpose of receiving the loop, into the requisite position for that purpose and holds them in that position.

6. A loop drawer, which grips the loop, takes it over from the loop twister pushes it along the warp threads up against the finished fabric, and draws it tight, The various arrangements comprised in the knotting device are operated by a control motion consisting of one or more cam discs provided with a number of cam grooves. In order to keep down the width of the knotting device to the smallest possible dimensions, it is advisable to distribute the cam discs 51, provided with the cam grooves 52 (Fig. 35), over two superimposed shafts 227, mounted in the casing 180. The cam discs 51 are preferably driven by worm gear, the worms 175 of which rest on the hollow shaft 174.

1. The colour selector.

The colour selector differs from those hitherto used in knotting looms in that the thread feeders are movably guided on a movable, adjustable carrier rail, provided with adjustable strikers subordinated to the thread feeders and connected with the cords of the jacquard.

These strikers coact with drivers which—through the agency of the strikers—bring the thread feeders, by the adjustment of the carrier rail, into the path of a pusher which moves the thread feeder into the feed position. This arrangement enables a perfectly accurate selection of the colour to be obtained, even when the thread feeders of the selector are set very close together, and thus prevents the selection of a wrong colour. Hence, an extremely large number of variously coloured pile threads can be employed for making the design, in spite of very compact construction, and without impairing the accuracy of selection.

Figure 3:
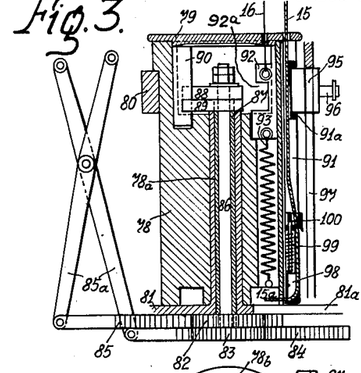
Fig. 3 is a vertical longitudinal section of the colour selector.
Figure 4:
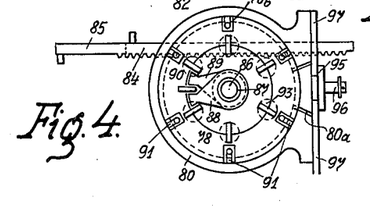
Fig. 4 and Fig. 5 are plans, showing the parts in the resting and working positions respectively.
Figure 5:
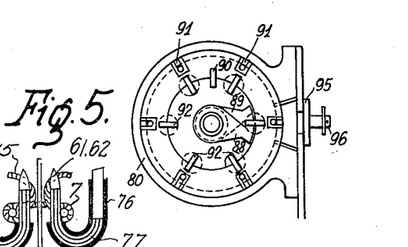

In the colour selector shown in Figs. 3, 4 and 5, the cylindrical carrier 78 for the thread feeders is rotatably mounted on a hollow shaft 78ª. The thread feeders 91 are mounted in longitudinal grooves 78ᵇ in the perimeter of the carrier 78, so as to be movable vertically. Figs. 4 and 5 show six thread feeders, but the number may be increased considerably. Each thread feeder consists of a flat body provided with a longitudinal slit through which the pile thread 15 can be threaded, said thread being inserted longitudinally at the upper end of the feeder 91 and issuing at the lower end through an opening which faces the carrier 78, a short length 15ª of the pile thread projecting radially therefrom. In the interior of the guide channel of the feeder is arranged a thread clamp 98, which is shown more clearly in Fig. 8. This clamp is pressed down by a spring 99 and grips the thread firmly in the feeder by means of the cheek 98. The striker 100 projects slightly from the thread feeder, so that it can ease the cheek of the clamp when the pile thread is to be drawn out. In the upper part 91ª of the feeder is cut a groove, by means of which all the feeders lie in a guide ring 80, which surrounds the carrier 78 and holds the whole of the feeders in the position of repose when the carrier is turned. The fixed base plate 81 is provided at one point with a gap 81ª through which the thread feeder that is to be brought into the feed position can pass downwards. The movement of the selected feeder into the feed position is effected by means of a slide 95 adapted to be moved up and down in vertical guides 97 by means of a pin 96. The slide 95 lies in a gap 80ª in the guide ring 80 and makes the ring complete. Behind each thread feeder 91, a striker 92 is guided longitudinally in the cylinder 78, and is drawn into the position of repose by a spring 93. Each striker 92 is connected to a cord 16 leading to the jacquard. The cylinder 78 is provided with a cover 79, through the bores in which the pile thread and the jacquard cords 16 can be passed. A fixed striker 90 is also provided inside the cylinder 78. The stationary hollow shaft 78ª of the cylinder 78 encloses a second hollow shaft 87, inside which is rotatably mounted the shaft 86. At the upper end of the hollow shaft 87 is arranged a driver 89, and at the upper end of the shaft 86 is a driver 88. Each of the shafts 86 and 87 carries at its lower end a toothed quadrant 82, 83, engaging with a rack 84, 85 respectively. The racks 84, 85 and drivers 88, 89 can be moved in relation to each other by means of the lever 85ª. The movable strikers 92 are provided with a gap 92ª through which the drivers 88, 89 can pass freely when the strikers 92 are in the position of repose.

2. The tongs.

Figures 28, 29:
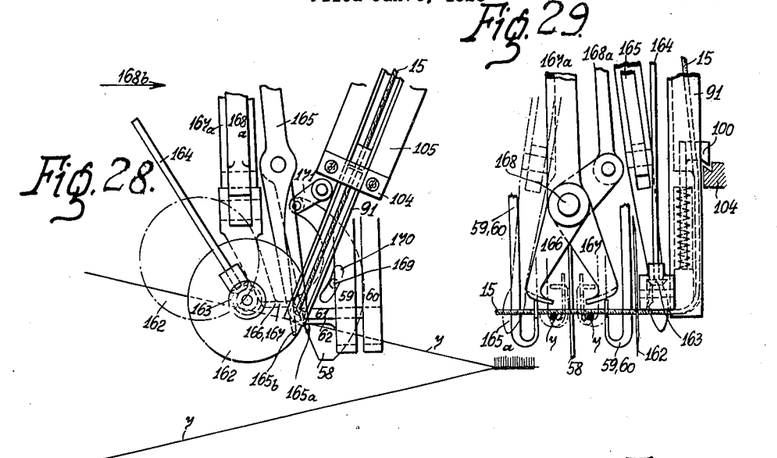
Figs. 28 and 29 show side and front elevations of the knotting device coacting with a loop twister according to Figs. 9–12.
Figure 35:
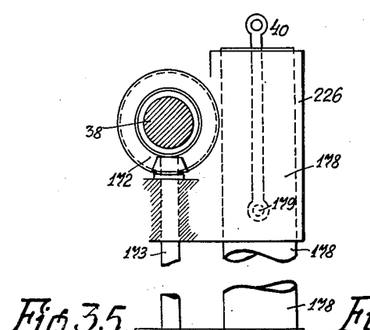
Fig. 35 is a side elevation of a knotting device.
Figure 36:
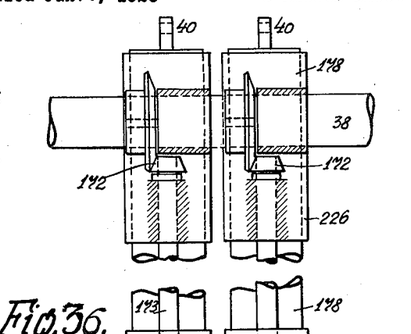
Fig. 36 is a rear elevation of two knotting devices arranged side by side.

The tongs which grip the ends 15ª (Fig. 3) of pile thread protruding from the thread feeder, draw out the pile threads and feed them to the loop twisters, are shown in Figs. 28, 29 and 35. They consist of the arm 165, carrying the one cheek 165ª and on which the other cheek 165ᵇ is articulated. This second movable cheek is connected with an arm 188 (Fig. 35) in connection with a bell-crank lever 187 pivotally mounted on the arm 165. The one arm of the bell-crank lever 187 is pivoted on the connecting rod 181 which, in turn, is guided, by means of a fork, on the lower control shaft 227, and on the other hand engages, by means of a pin 182, in a cam groove 52 of a disc 51. The connecting rod 181 and bell-crank lever 187 effect the opening and closing of the tongs. The arm 165 carrying the tongs is rotatably mounted, by means of a connecting rod 183ª, (Fig. 35) on the fixed pivot pin 183, so that the tongs can be raised and lowered to a slight extent. Moreover, the links provided in the rod 165 enable the whole arrangement to describe a swinging movement, perpendicular to the plane of Fig. 35, from the position indicated by the continuous lines in Fig. 29 into the position indicated by the broken (dash and dot) lines. The movement of the tongs is produced, through different cam grooves in the disc 51, by means of members not shown in the drawing.

3. The loop twister.

The loop twisters (Figs. 9–12) serving to grip the section of pile thread which is to be cut off, and to form the loop consist of two clips situated on either side of the pair of warp ends 7, 7 which are raised for the attachment of the loop. Each clip of the loop twisters consists of two flat rods 59 and 60 arranged at right angles to the warp ends and adapted to converge or diverge in parallel, their relative movement being guided by a pin 63 attached to the rod 60 and engaging in a bore in the other rod 59. At the lower end, each rod is provided with an upwardly bent extension $59^a$, carrying an extension $62^a$, or $61^a$, projecting in the direction of the warps. At the outer ends of these extensions are the jaws 62, 61, between which the pile thread 15 is clamped. This clamping is effected by the converging movement of the rods 59, 60, whilst the pile thread is released again by moving these rods apart. The jaws grip the piece of pile thread near its ends, and the two warp ends 7, 7 come into position between the two loop twisters. Between these is the pusher blade 58, which is articulated on a rockable lever arm 171 (Fig. 28) and is guided by means of a pin 169 projecting through an arched guide slit in the pusher 58, which projects between the two warp ends 7, 7.

4. The knife.

The drawn out piece of pile thread gripped by the loop twister is cut off by means of a circular knife 162 (Figs. 28, 29 and 35), which can be brought from the position of repose,—represented by broken (dot and dash) lines in Fig. 28, into the working position indicated by unbroken lines, and is caused to rotate by the shaft 164, through cone gearing 163. The shaft 164 is driven, through gearing not shown in the drawing, from the shaft 174, whilst the carrier on which the knife is mounted is moved into and out of the working position by means of a connecting rod (not shown) and the cam groove of an operating disc 51.

5. The warp-end guider.

The warp-end guider consists of a three-pronged fork 190 (Figs. 35 and 36) which is mounted in the casing 180, by means of a rounded head 194 so as to be rotatable in a guide 193 and moved up and down. The guide fork 190 is operated by means of a bell-crank lever 195, which is rotatably mounted in the casing on a pivot 192, and operates through the rod 196 articulated at 197. The rocking motion is transmitted to the lever 195 from the cam groove 52, through the rod $186^a$, whilst the rising and falling movement is effected by means of a pusher rod 186 engaging at 191.

6. The loop drawer.

The loop drawer (Figs. 28, 29 and 35) consists of a clip, the two jaws of which, 166 and 167, turn on a pivot 168 lying parallel to the warps. The clip is opened and closed by the rods $167^a$ and $168^a$, which are operated by cam grooves 52. The loop drawer, that is, its rod $167^a$, is suspended on a lever pivoting on the fixed pin 189, so that the drawer can be moved up and down by means of a rod 185 operated by a cam groove 52.

The knotting device operates in the following manner:

The jacquard 17, 22 lifts the cords 16 of the colour selector in accordance with the perforation of the cards, thus raising out of the position of repose the striker 92 corresponding to the selected colour in the colour selectors of all the knotting devices 14 (Fig. 3). The levers $85^a$ now come into operation and, by means of the racks 84, 85, the quadrants 83, 82 and the shafts 86, 87, turn the two drivers 88, 89 in opposite directions, from the position shown in Fig. 4 to that shown in Fig. 5. In this movement, each driver travels through nearly a semi-circle, engages the striker 92 which has been lifted by the jacquard into the working position, and turns the cylinder 78 in such a manner that the thread feeder 91 corresponding to the lifted striker 92 comes into position facing the slide 95. This slide is then moved downwards in the guides 97 and 105 (Figs. 28 and 35) by means of a cam groove 52 (Fig. 30) and lever mechanism (not shown), so that the thread feeder passes through the bottom opening $81^a$ (Fig. 3) and brings the loose end $15^a$ of the pile thread within reach of the tongs $165^a$, $165^b$ (Fig. 28). In the meantime the tongs have swung out of the position indicated by the dot-and-dash line (Fig. 29) into the position indicated by the unbroken lines, so that the free end of the pile thread lies between the two cheeks of the tongs, whereupon the tongs are closed. During the descent of the thread feeder, the nose 100 of the clip 98 strikes against the fixed stop 104 (Fig. 29) so that the clip is raised, against the action of its spring, and releases the pile thread in the feeder 91. The tongs 165 are swung back into the dot-and-dash line position, the tongs and loop twister being pushed far enough apart, in the vertical direction, to clear one another. In this way, a sufficient length of pile thread 15 to form a loop is drawn out, the pile thread coming into position between the upwardly directed opening of the cheeks of the loop twister, whereupon these are closed by the mutual convergence of the rods 59—60 (Fig. 10) and hold the pile thread tightly. In order to minimize the resistance offered by the pile thread, the arm 26 carrying the grid 23 (Fig. 1) is swung in such a manner that it draws the pile threads off the bobbins 30, over the guide rails 28, while the threads are clamped fast in the feeders. During the subsequent relaxing of the tension produced by the arm 26, the pile threads lie slack between the grid 23 and the knotting devices 14, so that, when the pile threads are drawn by the tongs 165$^a$, 165$^b$, only the frictional resistance of the thread feeders has to be overcome.

Figure 30:
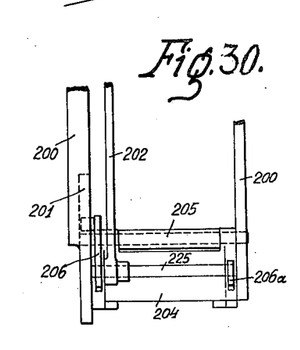
Fig. 30 is a side elevation of the figuring device, two positions of which, in front elevation, are shown in Figs. 31 and 32.

During the operations described above, the knotting device is in the position shown in Figs. 1 and 30, in which the lower end of the casing of the knotting device is turned towards the warps and the healds. The dobby 12 lifts those pairs of warp ends to which the loops are to be attached. The two threads of a pair are not, however, lifted simultaneously, the left one for example being lifted first, the guide forks 190 (Fig. 36) being first swung outward by the bell-crank levers 195 in such a way that the centre of the left-hand recess comes into position over the pair of warp ends to be lifted, whereupon the raised left-hand threads of the pairs are swung towards the left by the fork until the centre of the right-hand recesses of the forks come into position over the right-hand threads of the pairs to be lifted. The right-hand threads are now lifted, and when the two warp ends lie in the two recesses of the guide forks, the latter are returned to their central position. The pile thread which has been drawn out, and gripped by the loop twister, now lies on the two warp ends 7, 7.

The knife 162 is now approached to the pile thread and cuts off the length needed for forming the loop, whilst the thread feeder 91 (Fig. 29) is lifted to such an extent that the striker 104 releases the clip 99 and enables this to grip the pile thread again. The disc knife 162 is now returned from the position indicated by the unbroken lines (Fig. 28) into that shown by the broken lines. The loop twisters 61, 62 are next lowered so as to come into position under the warp ends 7, 7 whereupon the two loop twisters are caused to converge, while the pusher 58 projecting between the two warp ends moves in the direction of the arrow 58$^a$ (Fig. 10) and pushes that portion of the pile thread that is lying between the two warp ends 7, 7 so far forward that, on the loop twisters being moved upwards they are able to project upwards between a warp end 7 and the pusher in each case, without coming into contact with that portion of the pile thread which bridges over the two warp ends. The loop twisters are shown in this position, as a front and side elevation respectively, in Figs. 11 and 12. The knot is now finished and only has to be taken over by the loop drawer, pushed along the warp ends towards the finished fabric, and drawn tight.

Figures 11, 12:
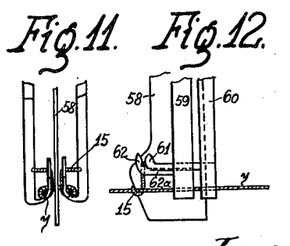
Figs. 11 and 12 are corresponding views of the loop twister after the formation of the loop for "Smyrna" knotting.

With this object, the loop drawer 166, 167 is moved from the position shown in Fig. 28 in the direction of the arrow 168$^b$, so that the jaws of the clip are brought to bear against the vertical members of the loop between the warp ends 7, 7 and the clamp arms 62$^a$ (Fig. 12). The pusher 58 is now drawn backwards and upwards by the operative mechanism, so as to be out of reach of the jaws of the loop drawer. These latter are then closed and grip the loop near its free ends, whereupon the clips of the loop twister are loosened.

The knotting devices 14 are now moved, in the direction of the arrow 168$^b$ (Figs. 1 and 28), towards the fabric, by means of a cam (not shown) on shaft 32, and actuating the rod 57, lever 54, shaft 53 and arm 55. Thus the loop, which is held taut solely by the loop drawer, is drawn along the warps and against the fabric. At the same time, the warp ends are lowered by the dobby and, if necessary, the loop drawer is lowered, round the pivot 189, by means of the rod 185. In drawing the loops against the fabric, the loop drawer pulls them just as tightly as in hand knotting.

After the loops have been tightened, the jaws of the loop drawer are opened in order to free the loops, and the knotting devices return to their initial positions shown in Fig. 1.

During the formation of a loop, the shafts 38 and 53, together with the knotting devices 14, are moved by the lead spindles 37 and 52 (Fig. 1) across the fabric for a distance equal to the space occupied by a loop, in each case.

When the loops have been completed in this manner, all the way across each section commanded by a knotting device, the main control shaft 31 stops the main shaft 33 of the knotting mechanism and the shaft 36 is turned by means of the rod 46, thus causing the levers 39 to lift the knotting devices into the position indicated by the broken lines (Fig. 1), whereupon the main shaft 32 of the loom is thrown into gear, by means of the slay 6, the loom beats the loops up against the fabric, and one or more picks of weft are inserted. The control shaft 31 then throws the main shaft 32 of the loom out of action, lowers the knotting devices 14 into working position by means of the shaft 36, and again connects up the control shaft 33 of the knotting mechanism, so that the cycle of operations recommences.

In this new stage, the direction of rotation of the lead spindles 37, 52 is reversed, for example by means of the main control shaft 31, so that the knotting devices come into operation in the opposite order across the width of the sections they command.

As already mentioned, the loom is also provided with two figuring devices 14ª (Fig. 2) which produce the selvedges of the carpet. The figuring devices are housed in casings similar to those of the knotting devices, and are also provided with hollow driving shafts 174 (Fig. 35) and a hollow shaft 178, by means of which the casings carrying the figuring devices can be suspended on the lever 39 and coupled to the driving shaft 38, in exactly the same way as the knotting devices. From Fig. 2 it can be seen that the row of knotting devices 14 is terminated by a figuring device 14ª at each end.

The casing and mechanism for operating the several tools and parts of the figuring device are similar to those of the knotting devices, and comprises the hollow driving shaft 174 (Fig. 35), worm wheels 175 and a number of cam discs 51 with cam grooves 52 which operate the tools and parts of the figuring device proper. This latter is illustrated in Figs. 30–34.

The figuring device is arranged between the two carrier plates 200, 200, which are provided, at the ends projecting downwards from the casing 180 (Fig. 35), with recesses 211ª (Figs. 31, 32), so as to form a two-prong fork for the reception of the lifted warp ends 7 (Fig. 32) under which the figuring shuttle is to be passed.

Figure 33:
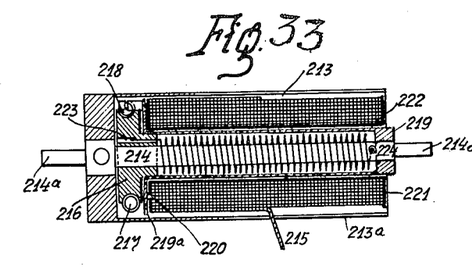
Fig. 33 is a longitudinal section through the figure bobbin.
Figure 34:
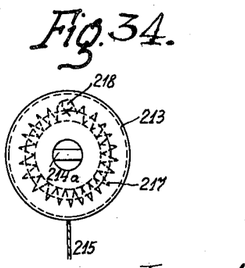
Fig. 34 being an end view of same.

The figuring shuttle illustrated in Fig. 33 consists of the bobbin 221, on which the figuring weft 215 is wound. The bobbin is slipped over a sleeve 219, so that a pin 220 carried on the flange 219ª of the sleeve 219 connects the bobbin with the sleeve. The sleeve 219 is rotatably mounted on the bobbin shaft 214 which is provided at both ends with flattened pins 214ª. The shaft 214 is fixed in the base of a cylindrical casing 213, provided with a longitudinal slot 213ª through which the figuring thread 215 is passed between the base of the casing 213 and the flange 219ª of the sleeve 219 is a rotatably mounted brake disc 216 which is coupled to the shaft 214 by means of a spiral spring 222 coiled around said shaft. For this purpose the one end of the spring 222 is connected to the shaft at 224, and the other end is connected to the brake disc 216 at 225. A groove in the brake disc 216 carries a brake ring 217 in the form of a continuous spiral spring, which is engaged by a pin 218 carried by the flange 219ª of the sleeve 219.

For the alternate reception of the figuring shuttle, two cheek plates 203 and 204 are provided, which are pivotally mounted on pins 205 attached to the plates 200. The cheek plates 203 and 204 are provided with curved slots 210 for the reception of the flattened terminal pins 214 of the figuring shuttle. The plates 203, 204 are connected to draw-bars 202, articulated thereto at 225, and each of said plates also carries a hook 206, indicated by dotted lines in Fig. 32, serving to retain the terminal pins 214ª of the figuring shuttles in the slots 210 of the cheek plates 203, 204, the said hooks being pressed into this working position by springs 209. The hooks 206 are pivotally mounted on pins 225 and are provided with arms 207 carrying at their ends studs 208. One of the plates 200 is provided on the inner side with a cam groove 201 (Figs. 30 and 31, engaging the studs 208 of the hook levers 207.

Figures 31, 32:
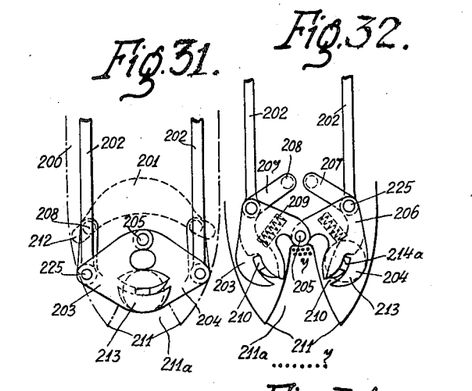

The figuring device operates in the following manner:

Assuming the cheek plates to be in the position shown in Fig. 32, and the pins 214ª of the figuring shuttle 213 to be lying in the slot 210 of the plate 204 and retained therein by means of the hook 206. When the shed is opened, a portion of the warp ends 7 enters the gap 211ª between the prongs 211 of the plate 200. Both the rods 202 are now depressed, whereby the two cheek plates 203 and 204 are swung on the pivots 205 and caused to converge so that their ends overlap (Fig. 31). At the same time, the hook 206 of the left hand cheek plate 203 slides over the terminal pin 214ª of the shuttle so that this terminal pin is held by both hooks 206. In this position of the figuring shuttle the studs 208 of the hook lever 207 approach the ends of the cam groove 201. If now, the left-hand rod 202 be slightly lifted, and the right-hand rod 202 further depressed, the stud 208 of the right-hand hook lever 207 arrives at the lower bottom end 212 of the cam groove 201, thus causing the right hook 206 to rise a little. Both rods 202 are now lifted at the same time, thus causing the cheek plates 203 and 204 to diverge into the position shown in Fig. 32, the left-hand plate 203, with locked hook 206, carrying the figuring shuttle with it. The shed is then changed and the operation repeated. The figuring shuttle is arranged in a casing similar to the casing 180 of the knotting device (Fig. 35).

Since the figuring shuttle and its casing corresponding to casing 180 (Fig. 35) describe—in the same manner as the knotting devices—a rocking movement about the shaft 38, from the vertical position shown in Fig. 1, in the direction of the arrow 168ᵇ, towards the fabric and back again, means must be provided for keeping the figuring thread 215 (Fig. 33) taut during the swing. This result is attained by the special method of mounting the bobbin 221 in the casing 213, described with reference to Fig. 33. When the thread 215 is unwound from the bobbin, the latter revolves, carrying with it the sleeve 219 by means of the pin 220, said sleeve carrying round the brake disc 216, by means of the pin 218 and spring brake ring 217, thus tensioning the spring 222. Directly the tension of the spring 222 overcomes the friction between the ring 217 and the disc 216, the ring slides on the disc, allowing a further quantity of thread 215 to unwind from the bobbin. When the tension on the thread 215 relaxes, the spring 222 contracts and turns the bobbin in the opposite direction, so that sufficient thread is re-wound to maintain constant tension.

The rods 202 of the figuring device are controlled by cam grooves and cam discs 51 (Fig. 35), which are operated in the same manner as described in connection with the knotting devices. As also described in that connection, the figuring device can be suspended on any portion of the shaft 38, to enable the loom to be used for any width of carpet.

The figuring device operates during the working of the knotting mechanism and inserts one or more picks in the selvedges. The shed for the selvedge picks is changed one or more times during the working period of the knotting mechanism, according to the number of selvedge picks to be inserted to a row of loops. The changes are preferably effected at the moments when the fork gap 211ª of the figuring device is in position over the selvedge during the lateral movement of the shafts 38 and 53 (Fig. 1).

The devices described above are merely given by way of example and may be modified in various ways without affecting the fundamental principle of the invention.

Thus, for example, the jacquard machine may be replaced by any known similarly operating device for controlling the cords 16 of the colour selectors. The dobby also may be replaced by any equivalent known, in connection with looms, for selectively and alternately raising and lowering the healds commanding the warp ends.

Instead of housing each knotting device in a separate casing 180 (Figs. 35 and 36), two or more knotting devices may be arranged in a single casing so as to be operated by a common driving and control device.

By using for example groups of five and two knotting devices (and also single knotting devices) the number of same can be arranged to meet the needs of any width of carpet.

Instead of pushing the knotting devices across the stationary loom, this relative movement might be effected by shifting the weaving mechanism.

Figures 6, 7, 8:
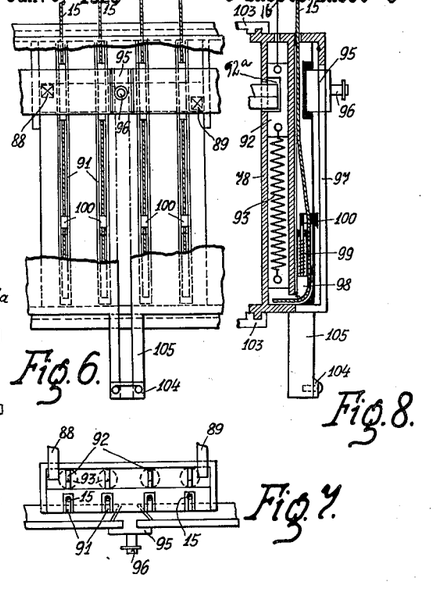
Figs. 6, 7 and 8 show a modification of the colour selector, as a front elevation, plan and vertical section respectively.
Figures 9, 10:
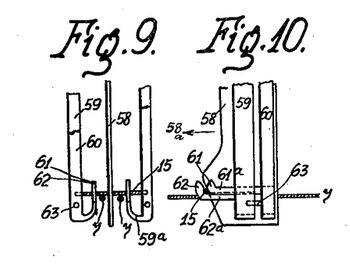
Figs. 9 and 10 show a loop twister in front and side elevation prior to the formation of the loop.

In the case of the colour selectors, it is essential that the individual thread feeders should be movably arranged on an adjustable carrier. In the embodiment according to Figs. 3, 4 and 5, the carrier 78 is cylindrical and is rotatably mounted. It might also be arranged to move in a straight line, or be mounted in any other way. Figs. 6, 7 and 8 show such a modification of the colour selector, in which the carrier 78 for the thread feeder 91 is formed as a plate and operates as a slide in straight guides 103; the relative movement of the two drivers 88 and 89 being also in a straight line. No further description of the colour selector is needed, the operation of the parts, which are marked with the same reference numerals as in Figs. 3-5, being the same as in the rotary colour selector already described.

Figure 27:
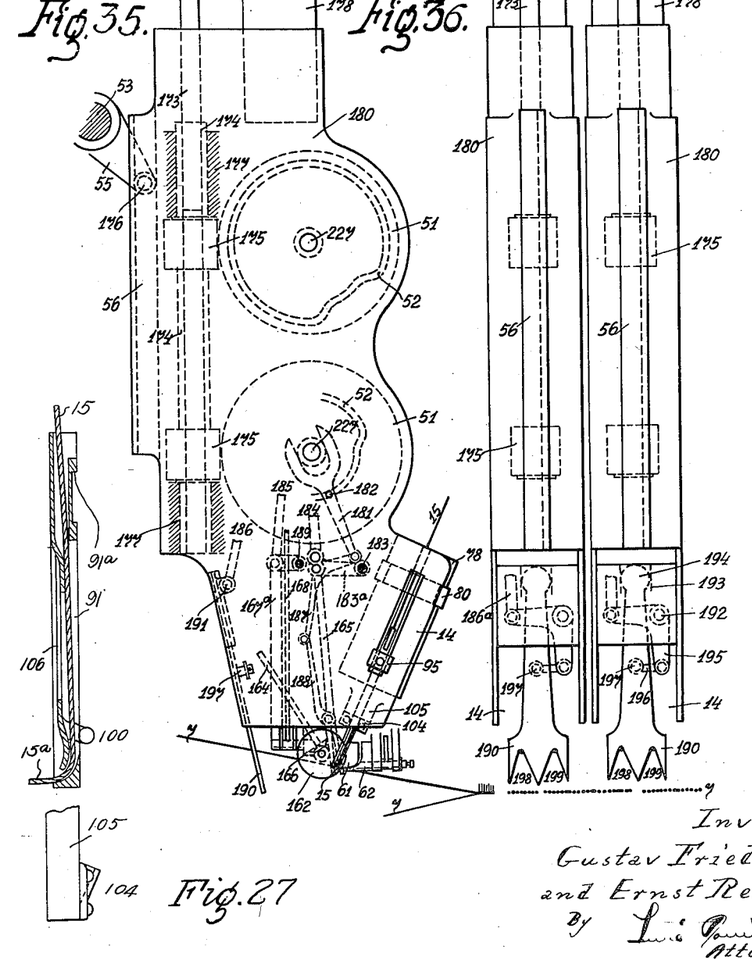
Fig. 27 is a modification of the pile thread feeder, that is, the thread clamp of same.

Fig. 27 shows a modification of the thread clip attached to the thread feeder 91. This clip consists of a flat spring 106, the lower end of which presses the thread against the wall of the feeder. On the feeder being moved forward into feeding position, it enters the guide 105 (Figs. 6 and 8), and the fixed wedge-shaped striker 104 moves the spring away from the thread by means of the striker 100 attached to the spring 106.

The foregoing description relates to the working of the knotting devices in forming the so-called "Smyrna" knots (Figs. 9-12). The same loop twister can, however, also be applied for making the so-called "Persian" knot, for which purpose the only alteration necessary is in connection with the movement (control) of the warp ends.

Figure 13:
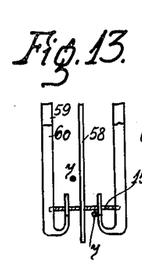
Figs. 13 and 14 show the same loop twister, as a front elevation, for making "Persian" knots, before and after the formation of the loop.
Figure 14:
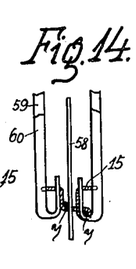

Figs. 13 and 14 show how the Persian knot is made. In this case, the pile thread 15 is laid over only one of the pair of warp ends 7, so that the middle portion of the loop passes between the two warps, whilst, as can be seen in Fig. 13 the other warp end remains lifted. On the loop twister then describing its specific rotary movement, as already stated, only that portion of the pile thread which lies above the one warp end will be twisted (Fig. 14) round the right-hand warp end of Fig. 13, whereupon the other left-hand warp end is lowered. Hence the device and the auxiliary devices coacting therewith operate in the same manner as described in connection with "Smyrna" knots.

Figure 15:
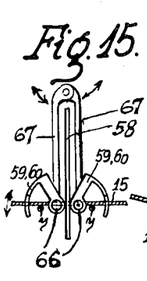
Figs. 15 and 16 represent a front and side elevation respectively of a loop twister with movable cheeks, prior to the formation of the loop.
Figures 16, 17:
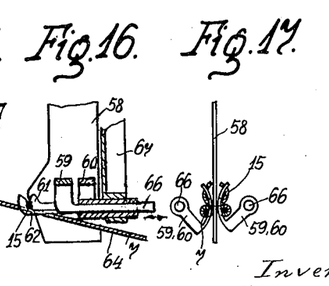
Fig. 17 shows the same device, in front elevation, after the loop has been formed.

Instead of arranging the loop twister to move in a straight line, as described with reference to Figs. 9-14, it may also be rotatably mounted on its carriers as shown in Figs. 15-17. Each of the loop twisters (right and left) is rotatably mounted on a rod 67, and each twister consists of two arms 59, 60, each carrying a jaw 61, 62. To enable the jaws to be opened and closed, the arms 59, 60 are mounted in such a manner as to diverge and converge parallel. For this purpose the arm 59 is attached to a pin 66 which passes through a sleeve 64 on the arm 60. To enable the specific rotary movement to be effected from the position shown in Fig. 15 to that in Fig. 17, the sleeve 64 is rotatably mounted in the rod 67. During the specific rotary movement, the pins 64 and 66 are rotated at the same time.

According to Figs. 15-17, the pivots of the loop twister prior to the specific rotatory movement are directed inwards, whilst the jaws point outwards. In order to enable the length of pile thread needed for forming a loop to be reduced to a minimum, the pivots of the loop twister may, as shown in Figs. 21-23, be arranged so as always to lie on the outside.

In the loop twisters described above, a compound movement must be performed, whereas Figs. 18-20 show modifications of the loop twister in which the shafts of the jaws are provided with flexible members adapted to move in curved guides. According to Fig. 18, the flexible member 77 consists of a flat chain travelling in the curved, shallow guide channel 76. The bottom link of the chain 77 carries the jaws 61, 62. When the rods or shafts 59, 60 of the jaws 61, 62 are depressed the latter are moved along the curved track 76, the chains 77 being able to follow the curvature. According to Figs. 20, 24 and 25, the flexible portion of the shafts 59, 60 consists of a number of flat springs 77, or of woven metal or the like.

The embodiment shown in Figs. 24-26 differs from the arrangement according to Figs. 18-20 in that, whereas in the latter the curved guide 76 is situated between the initial position of the jaws, it lies outside that position in the arrangement according to Figs. 24-26. This enables the shortest possible length of pile thread to be used in conjunction with a relatively large radius of curvature of the curved guide 76.

Another difference consists in the method of operating, that is, in the method of actuating the various parts of the loop twister. Whereas in the embodiment according to Figs. 18-22, as soon as the warp ends are lifted into contact with the pile threads, a single pressure on the rods 59, 60 brings them into the final position in which the loop is already formed, in the embodiment according to Figs. 24-26, these rods must describe a compound movement in relation to the warp ends in order to form the loop, that is to say, the jaws must first come into position below the plane of the two warp ends—which can be effected by moving the jaws, or the warp ends, or both—after which the jaws must be caused to converge and be finally lifted again between the warp ends.

The colour selector shown in Figs. 3 and 4 must always be returned to its initial position after selecting a colour. If this is to be avoided, the small striking plate 90 must be removed. In such case, however, only half the perimeter of the drum 78 can be utilized for the reception of pile-thread feeders.

In the foregoing, it has been assumed that the knotting devices work on the sections of fabric allotted to them, from right to left and from left to right alternately. The method of operating may, however, be such that, when a row of loops has been completed the knotting devices are returned to their original position and work the next row of loops in the same order as before.

The transverse movement of the knotting devices may either be effected intermittently, after making each loop, or may proceed continuously.

For twisting-in the pile threads, the warp ends are lifted in pairs, as described above, not simultaneously, however, but, in conjunction with the warp-end guides, first one member of the pair and then the other. This separate timing of the lifting of the warp ends is effected, according to Figs. 2 and 4, by using two dobbies which do not act simultaneously on the warp ends; but it can also be effected with a single dobby, for example, by making the comber board 9 (Figs. 1 and 2) in two parts, the even numbered warp ends, that is to say, their healds, being passed through the one half, and the odd numbers through the other half. By moving the rearward half of the board 9 (the one further away from the loom minder) all the even numbered ends are lifted, so that when the dobby lifts an even numbered and an odd numbered end in each section of the fabric, the even numbered ends lie higher than the odd numbered ones.

We claim:

1. A loom for weaving knotted carpets, comprising a number of simultaneously operating knotting devices each commanding a section in the width of the warps, rockable frames in which the knotting devices are mounted, a shaft arranged in each frame and adapted to actuate all the parts of a knotting device, gearing for driving each shaft, and a cross shaft extending over the full width of the loom and adapted to drive said gearing.

2. A loom as claimed in claim 1, in which the knotting devices are individually mounted in the rockable frames.

3. A loom as claimed in claim 1, in which the knotting devices are mounted in groups in the rockable frames.

4. In a knotting and weaving loom as claimed in claim 1, slides on which the driving shafts common to all the knotting devices are mounted, said slides being adapted to move transversely in relation to the loom.

5. In a knotting and weaving loom as claimed in claim 1, the provision of figuring devices serving to form the selvedges, control mechanism for transforming the rotary movement of the driving shaft into the movements operating the figuring device, and frames suspended from the driving shaft and carrying the figuring devices.

6. A loom for weaving knotted carpets, comprising a number of simultaneously operating knotting devices each commanding a section in the width of the warps, rockable frames in which said devices are mounted, a driving shaft extending across the loom, means for actuating all of said devices from said shaft, a number of figuring devices adapted to form selvedges, rockable frames in which said figuring devices are mounted, each of the frames for the knotting and figuring devices comprising two relatively adjustable parts and a telescopic shaft connecting said parts, one part of each of said frames being mounted on the cross shaft and having a gear to connect the cross shaft and the telescopic shaft, and the other parts of said frames carrying the knotting and figuring devices actuated by the telescopic shafts.

7. A loom as claimed in claim 6, having a rock shaft provided with pivot arms, and detachable connections between said arms and those parts of the frame which carry the knotting and figuring devices, whereby said parts, suspended by said connections, may be raised and lowered.

8. A loom as claimed in claim 6, having a rock shaft extending across the loom, pivots on said shaft, said pivots being detachably and slidably connected with the frames, whereby the latter may be swung about the axis of the driving shaft.

9. In a knotting and weaving loom as claimed in claim 6, the mounting of discs which are provided with cam grooves in those parts of the frames which carry the knotting and figuring devices, and the provision of worm gearing between said discs and the telescopic shafts, for controlling the knotting and figuring devices by means of said cam grooves.

10. In a loom as claimed in claim 1, a colour selector comprising thread feeders adapted to contain the ends of variously coloured pile threads and feed said threads to the knotting devices, an adjustable common carrier on which said feeders are mounted, a jacquard machine to control said carrier, adjustable strikers cooperating with said thread feeders and connected with the cords of the jacquard, drivers cooperating with said strikers, and a pusher for the thread feeders, said strikers being adapted to move the selected thread feeder into the path of the pusher, which pushes the feeder into the feeding position.

11. A loom for weaving knotted carpets, comprising rockable frames; a knotting mechanism consisting of a number of simultaneously operating knotting devices mounted in said frames, each of said devices controlling a section in width of the warps; means for actuating said knotting devices; means for lifting the warps; and a loop twister for the knotting mechanism, comprising a pair of clips each provided with two jaws, and separate carriers on which said jaws are mounted and adapted to converge for closing the jaws, said clips gripping the two ends of the section of pile thread and serving to make the loop outside the pair of warp ends which have been lifted to receive the loop.

12. A knotting device as claimed in claim 11, provided with a movable pusher arranged between the two sets of clips of the loop twister and projecting between the pair of warp ends that have been lifted for the purpose of forming the loop, said pusher moving that portion of the section of pile thread which bridges over the pair of warp ends out of the way of the loop-twister clips which penetrate between said warp ends.

13. A loop twister as claimed in claim 11, in which the clip jaws are connected to their carriers by means of a flexible pressure member led through a curved guide.

14. A knotting device for the knotting mechanism as claimed in claim 11, equipped with a loop drawer adapted to grip the knotted loop between the ends held by the clips of the twister and the warp ends carrying the loop, and to hold them tightly during the movement of the knotting devices in the direction of the finished fabric, so that the knotted loops are drawn tight.

15. A loom for weaving knotted carpets, comprising a number of simultaneously operating knotting devices, each commanding a section in the width of the warps, rockable frames in which said devices are mounted, a shaft in each frame adapted to actuate all the parts of the knotting device, gearing for driving each shaft, a common driving shaft extending across the loom and adapted to drive said gearing, means for lifting the warps, a colour selector mounted on each frame for each knotting device, each selector comprising thread feeders adapted to contain the ends of variously coloured pile threads and feed said threads to the knotting devices, an adjustable common carrier on which said thread feeders are mounted, a jacquard to control said carrier, adjustable strikers cooperating with said thread feeders and connected with the cords of the jacquard, drivers cooperating with said strikers, and a pusher for the thread feeders, said strikers being adapted to move the selected thread feeder into the path of the pusher, which pushes the feeder into the feeding position, each thread feeder being provided with three superimposed clips and a warp-end guide, which moves the warp ends, that have been raised to receive the loop, between the two lower clips of the thread feeder and into contact with the pile thread, each frame for the knotting devices also supporting a knife, a loop drawer and members which open the clips of the thread feeders.

16. A loom as claimed in claim 6, in which each figuring device includes a sleeve adapted to receive a figuring bobbin, said sleeve being mounted on the rotating shaft of said bobbin by means of a spring and a braking device, whereby, during the unwinding of the figuring thread, the spring is first subjected to tension, and the braking device does not until then begin to turn on the shaft.

In testimony whereof we affix our signatures.

GUSTAV FRIEDRICH.
ERNST REICH.